United States Patent [19]

Chen et al.

[11] Patent Number: 4,900,792
[45] Date of Patent: Feb. 13, 1990

[54] CROSSLINKABLE POLYETHYLENE COMPOSITION

[75] Inventors: Shu P. Chen; Theodore R. Engelmann; Harold D. Oltmann, all of Baton Rouge, La.

[73] Assignee: Allied-Signal Inc., Morris Township Morris County, N.J.

[21] Appl. No.: 285,674

[22] Filed: Dec. 16, 1988

Related U.S. Application Data

[62] Division of Ser. No. 503,989, Jun. 13, 1983, Pat. No. 4,857,257.

[51] Int. Cl.$^4$ .................. C08F 255/02; C08F 5/14; C08F 5/32
[52] U.S. Cl. .................. 525/264; 525/366; 525/368; 525/369; 525/370; 525/371; 525/373; 525/377; 525/333.8; 524/336; 524/536
[58] Field of Search .................. 525/264, 377

[56] References Cited

U.S. PATENT DOCUMENTS

| | | | |
|---|---|---|---|
| T900,019 | 7/1972 | Murphy et al. | 260/878 |
| 3,372,139 | 3/1968 | Behr | 260/41 |
| 3,477,985 | 11/1969 | Bucci et al. | 260/41 |
| 3,567,697 | 5/1971 | Bates | 260/78.4 |
| 3,806,555 | 4/1974 | Nagaoka | 260/878 |
| 3,876,613 | 4/1975 | Needham et al. | 260/45.85 |
| 3,954,907 | 5/1976 | Schober | 260/875 |
| 3,974,114 | 8/1976 | Sowa | 260/23 H |
| 3,974,132 | 8/1976 | Valdiserri | 260/878 |
| 4,010,127 | 3/1977 | Taka et al. | 260/80 |
| 4,018,852 | 4/1977 | Schober | 260/878 |
| 4,028,332 | 6/1977 | Needham et al. | 260/45.8 |
| 4,105,609 | 8/1978 | Machon et al. | 260/23 |
| 4,115,508 | 9/1978 | Hughes | 264/310 |
| 4,267,080 | 5/1981 | Yokoyama et al. | 260/4 |
| 4,301,063 | 11/1981 | Sowa | 260/45.85 |
| 4,320,214 | 3/1982 | Harayama et al. | 525/264 |
| 4,440,893 | 4/1984 | Kallenback et al. | 524/305 |

FOREIGN PATENT DOCUMENTS

| | | |
|---|---|---|
| 87210 | 8/1983 | European Pat. Off. |
| 27063 | 8/1971 | Japan |
| 125232 | 8/1982 | Japan |
| 126833 | 8/1982 | Japan |
| 1135848 | 8/1982 | Japan |
| 145137 | 9/1982 | Japan |
| 149343 | 9/1982 | Japan |

*Primary Examiner*—Carman J. Seccuro
*Attorney, Agent, or Firm*—Roger H. Criss

[57] ABSTRACT

The present invention relates to a composition comprising crosslinkable polyethylene homopolymer, copolymer or mixture thereof. The composition includes a peroxide crosslinking agent, a crosslinking co-agent, and a metal compound having a cation selected from Group IIA and IIB of the Periodic Table of Elements. The composition is particularly useful for polymers which are formed using Ziegler-type catalysts and have complete terminal saturation. The present invention also includes a composition which has been found particularly suitable for use in critical molding processes such as rotational molding. This composition comprises a polyethylene homopolymer, copolymer, or mixture thereof. The present invention includes a method of rotational molding.

17 Claims, No Drawings

CROSSLINKABLE POLYETHYLENE COMPOSITION

This application is a division, of application serial no. 503,909, filed 6/13/83, now Pat. No. 4,857,757.

BACKGROUND OF THE INVENTION

The present invention is in the field of crosslinkable polyethylenes; more particularly the present invention relates to a crosslinkable polyethylene composition and a method of rotational molding using the crosslinkable polyethylene composition.

Rotational molding, also known as rotomolding, is used in the manufacture of hollow objects from thermoplastics. In the basis process of rotational molding, polymer is placed in a mold. The mold is first heated and then cooled while being rotated. The mold can be rotated uniaxially or biaxially and is usually rotated about two perpendicular axes simultaneously. The mold is heated externally and then cooled while being rotated. Included in polymers useful in rotational molding are a variety of polyolefins such as polyethylene including crosslinkable polyethylene. A general discussion of rotational molding is given in "Modern Plastics Encyclopedia 1979–1980", Vol. 56, No. 10A, beginning at page 381. Rotational molding has a feature such that it can result in hollow articles which are, as compared with those obtained by blow molding methods, complicated, large in size and uniform in wall thickness, and further the material loss is minor.

Compositions of interest relating to crosslinking polyethylene are disclosed in U.S. Pat. Nos. 3,372,139; 3,806,555; 3,876,613; 3,974,132; 4,018,852; 4,028,3332; and 4,267,080. Crosslinkable polyethylene rotational molding compositions are disclosed in U.S. Pat. Nos. 3,876,613 and 4,267,080.

Polyethylene is commonly polymerized using two types of catalyst systems. The first is a chromium based system which results in a polymer having terminal unsaturation. The second type of catalyst is a Zieglertype catalyst which results in the polymer having terminal groups which have substantially complete terminal saturation. Additionally, polymers formed with the Ziegler-type catalysts have been found to contain residue acidic compounds, most commonly chlorides. It has been found that crosslinkable polyethylene formed with use of the Ziegler-type catalysts cannot be used in critical molding operations, such as rotational molding. Articles rotationally molded from crosslinkable polyethylene made with a Ziegler-type catalyst exhibit satisfactory surface appearance, mold release, and impact properties when molded using methods disclosed in the art such as in U.S. Pat. Nos. 3,876,613 and 4,267,080.

SUMMARY OF THE INVENTION

The present invention relates to a composition comprising crosslinkable polyethylene homopolymer, copolymer or mixture thereof. The composition includes a peroxide crosslinking agent, a crosslinking co-agent, and a metal compound having a cation selected from Group IIA and IIB of the Periodic Table of Elements. The composition is particularly useful for polymers which are formed using Ziegler-type catalysts and have substantially complete terminal saturation.

The present invention also includes a composition which has been found particularly suitable for use in critical molding processes such as rotational molding. This composition comprises a polyethylene homopolymer, copolymer, or mixture thereof. The polymers are formed using Ziegler-type catalysts and have substantially complete terminal saturation. The composition includes a peroxide crosslinking agent, and an allyl carboxylate crosslinking co-agent.

The composition of the present invention has been found particularly useful in molding operations and most particularly in rotational molding. The present invention includes a method of rotational molding using the above-described compositions.

DESCRIPTION OF THE PREFERRED EMBODIMENTS

The present invention is a crosslinkable polymer composition where the polymer is selected from the group consisting of ethylene homopolymers and copolymers, and mixture thereof. The composition includes an organic peroxide crosslinking agent, a crosslinking co-agent, and preferably a metal cation selected from Group II of the Periodic Table of Elements.

The ethylene polymer used may be either a polyethylene such as high density, medium density or low density polyethylene, or an ethylene copolymer comprised of at least 85% by weight of ethylene and not more than 15% by weight of a $C_3$ to $C_{10}$ α-olefin. The ethylene polymers may be used alone or in combination. The ethylene polymers should be of a high fluidity, i.e., possess a melt index (as determined according to ASTM D-1238, condition E: hereinafter referred to as "MI" for brevity) of at least 2 g/10 min., preferably from 5 to 200 and more preferably from 5 to 40 g/10 min. Preferably the ethylene polymers used in the invention have a melt index of at least about 10 g/10 min., and a density in the range of 0.920–0.970, preferably 0.940–0.965.

The crosslinkable composition of the present invention is particularly useful when the ethylene polymer is produced by methods using a Ziegler catalyst such as those described in U.S. Pat. Nos. 3,070,549 and 3,901,744 which result in a polymer having substantially complete terminal saturation.

A review of the Ziegler catalyst and the mechanism in polymerization is found in Billmeyer, *Textbook of Polymer Science*, Second Edition, Wiley-Interscience, beginning a page 319 (1971). Here Ziegler-type catalysts are described as complexes formed by the interaction of alkyls of metals Group I-III in the Periodic Table with halides and other derivatives of transition metals of Group IV and Group VIII. A commonly used Ziegler-type catalyst is a complex between an aluminum alkyl and titanium halide where the halide is chloride. Postulated structures are shown in the Billmeyer text. When such a catalyst is used, typically chloride compounds remain in the ethylene polymer matrix after polymerization. It has been found that, as a result of this, residue resulting from Ziegler type catalysts, ethylene polymers which are crosslinked contain bubbles and non-homogenities. The gel content is not as high; and when molding, the crosslinkable ethylene polymers warp and do not have good mold release.

There is preferably, a sufficient amount of a metal compound, containing a metal cation from Group IIA or IIB of the Periodic Table to substantially neutralize any acidic compound such as acidic catalyst residue or other acidic elements in the polymer matrix. Typically there are at lest 0.005 parts, more preferably 0.05 to 0.5 parts and more preferably 0.05 to 0.15 parts of a metal compound which provides the metal cation. Adding the basic compound, preferably a metal compound containing a Group IIA or IIB metal cation, results in a composition which has good color stability upon crosslinking. The basic material is preferably a metal cation which is provided as a metal compound having a corresponding anion which can be selected stearates, oxides, hydroxides, hydrides, formates, acetates, alcoholates and glycolates. The most preferred metal compounds are zinc stearate, calcium stearate, magnesium oxide, and calcium hydroxide. The metal compound is useful in ethylene polymers to substantially neutralize acidic compounds in the polymer composition. Although the preferred ethylene polymers for use in the present invention have terminal saturation, the metal compound can be used in any ethylene polymer whether there is terminal unsaturation or not.

The crosslinking agent can be any suitable crosslinking agent for crosslinking ethylene polymers. Preferably the crosslinking agent is an organic peroxide crosslinking agent. A preferred organic peroxide crosslinking agent has the formula

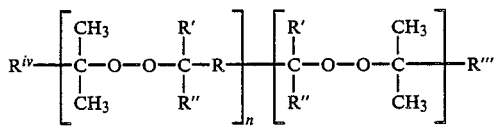

wherein R is a $C_2$ to $C_{12}$ divalent hydrocarbon radical,
R' and R'' are the same or different $C_1$ to $C_{12}$ alkyl groups,
R''' and $R^{iv}$ and the same or different $C_1$ to $C_{12}$ monovalent hydrocarbon radicals, and
n is 0 or 1, Crosslinking agents useful in the present invention are bis(t-alkylperoxy) alkanes, bis(-alkylperoxy) benzenes, and bis(t-alkylperoxy) acetylenes. Illustrations of the bis(t-alkylperoxy) alkanes are 2,5-bis(t-amylperoxy)-2,5-dimethylhexane, 2,5-bis(t-butylperoxy)-2,5-dimethylhexane, 3,6-bis(t-butylperoxy)-3,6-dimethyloctane, 2,7-bis(t-butylperoxy)-2,7-dimethyloctane and 8,11-bis(t-butylperoxy)-8,11-dimethyloctadecane. Illustrations of the bis(to-alkylperoxy) benzenes are a,a'-bis(t-amylperoxy-isopropyl)-benzene. Of these crosslinking agents, 2,5-bis(t-butylperoxy)-2,5-dimethylhexane and a,a'-bis(t-butylperoxy-isopropyl)benzene are preferred.

Illustrative of acetylenic diperoxy compounds are those disclosed in U.S. Pat. No. 3,214,422 hereby incorporated by reference. The compounds include hexynes, octynes, and octadiyenes. Examples of these include:

2,7-Dimethyl-2,7-di(b-butylperoxy)octadiyne-3,5
2,7-Dimethyl-2,7-di(peroxyethyl carbonate)octadiyne-3,5
3,6-Dimethyl-3,6-di(peroxyethylcarbonate)octyne-4
3,6-Dimethyl-3,6(t-butylperoxy)octyne-4
2,5-Dimethyl-2,5-di(peroxy-n-propyl)carbonate)hexyne-3
2,5-Dimethyl-2,5-di(peroxyisobutylcarbonate) hexyne-3
2,5-Dimethyl-2,5-di(peroxyethylcarbonate)hexyne-3
2,5-Dimethyl-2,5-di(alpha-cumylperoxy)hexyne-3
2,5-Dimethyl-2,5-di(t-butylperoxy)hexyne-3.

The amount of the crosslinking agent to be blended with the ethylene polymer may vary depending upon the desired degree of crosslinking, the activity of the crosslinking agent used, the crosslinking aid used and the crosslinking conditions. Usually, the amount of the crosslinking agent is in the range of from 0.1 to 3 parts by weight, preferably from 0.2 to 1.5 parts by weight, and more preferably 0.5 to 0.8 parts by weight, based on 100 parts by weight of the polymer.

Preferred organic peroxide crosslinking agents have the formula:

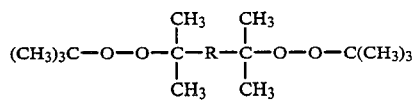

wherein R is selected from the group of

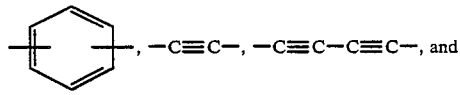

$+CH_2-CH_2)_{\overline{m}}$ wherein m = 1 to 8.

The crosslinkable ethylene polymer composition of the present invention includes a crosslinking co-agent which helps to regulate the generation of free radicals and thus modifies the type of crosslink and improves the efficiency of the crosslinking reaction. Furthermore, the use of the crosslinking co-agent permits the use of less peroxide. A particularly preferred class of coagents for a composition particularly suited for rotational molding is allyl carboxylates. Crosslinking coagents include allyl compounds, diallyl compounds, triallyl compounds, dimethacrylate compounds, and 1,2-polybutadiene. Illustrative of allyl compounds is allyl methacrylate. Illustrative of the diallyl compounds are diallyl itaconate, and diallyl phthalate. Illustrative of compounds are triallyl trimellitate, triallyl trimethallyl trimellitate, triallyl cyanurate, and triallyl phosphate. Illustrative of dimethacrylate compounds are ethylene dimethacrylate, polyethylene glycol dimethacrylate, and trimethylol propane trimethacrylate. Other useful crosslinking co-agents include but are not limited to divinylbenzene, vinyltoluene, vinylpyridine, p-quinone dioxime, acrylic acid, cyclohexylmethacrylate. Other useful crosslinking co-agents are indicated as crosslinking aides in U.S. Pat. No. 4,267,080 which is hereby incorporated by reference.

Allyl carboxylates such as triallyl trimellitate (also known as 1,2,4-benzenetricarboxylic acid tri-2-propenyl ester), trimethallyl trimellitate diallyl phthalate, allyl itaconate, and allyl methacrylate are useful for compositions to be used in rotational molding. These coagents help suppress bubble formation and enhance the release characteristics when used in combination with the crosslinking agent used in the invention.

The amount of the crosslinking co-agent used is preferably from 0.5 to 5 parts by weight, more preferably from 1.0 to 3.0 parts by weight based on 100 parts of polymer. When the amount of the crosslinking coagent is less than the above-mentioned lower limit, bubbles are more likely to form due to decomposition of the crosslinking agent. When the amount of the crosslinking co-agent exceeds the above-mentioned upper limit, the ethylene polymer composition becomes poor in thermal resistance and thus, is colored to some extent due to the exposure to the rotational molding temperature.

The composition of the present invention preferably includes a peroxide scavenger, preferably a thio compound. There is 0.01 to 0.1, and preferably 0.05 to 0.08 parts of the peroxide scavenger. The peroxide scavengers prevent premature crosslinking during compounding and flow out stages of molding. This results in molded articles with good impact resistant properties. Peroxide scavengers known in the art can be used. Useful peroxide scavengers include organic phosphonates, organic phosphonites, organic phosphates, with thio compounds being most preferred.

Illustrative of the peroxide scavengers which can be used include di(stearyl)pentaerythritol diphosphite, tetrakis(2,4-di-t-butylphenyl)4,4'biphenylyene-diphosphonite, pentaerythrityl hexylthiopropionate, and thiodipropionate polyester. The thio compounds also include those disclosed in Japanese Kokai JP 57,126,833. The preferred peroxide scavengers are esters of thiodipropionic acids of the formula:

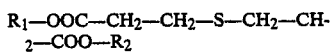

wherein $R_1$ and $R_2$ are selected from the group consisting of hydrogen and alkyl, alkenyl, aryl, and cycloalkyl hydrocarbon radicals and combinations thereof such as alkaryl, aralkyl and alkylcycloalkyl, having up to 22 carbon atoms and wherein at lest one R has at least 10 carbon atoms per molecule. These esters result in a composition having good low temperature impact strength.

Some suitable R radicals include for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, lauryl, stearyl, myristyl, oleyl, phenyl, xylyl, tolyl, ethylphenyl, naphthyl, cyclohexyl, benzyl, cyclopentyl, methylcyclohexyl, ethylcyclohexyl, and naphthenyl.

Examples of suitable thiodipropionic acid esters include, monolauryl thiodipropionic acid, butyl stearyl thiodipropionate, 2-ethylhexyl lauryl thiodipropionate, dissodecyl thiodipropionate, isodecyl phenyl thiodipropionate, benzyl lauryl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid. Thiodipropionate polyesters can also be used.

A presently preferred group of esters of thiodipropionic acid in which both R radicals have 12-20 carbon atoms, more preferably esters in which both R groups are the same, including the dilauryl, distearyl, dimyristyl, dioleyl and diricinoleyl esters.

In addition to the ethylene polymer, the crosslinking agent and co-agent, the compositions of the present invention also advantageously include about 0.01 to 0.1 and, preferably 0.02 to 0.05, parts by weight of one or more suitable high temperature antioxidants for the ethylene polymers, per 100 parts by weight of polymer in such compositions.

The preferred antioxidant is a hindered phenol type of antioxidant. Such compounds include 1,3,5-trimethyl-2,4,6-tris(3,5-di-t-butyl-4-hydroxy benzyl)benzene; 1,3,5-tris(3,5-di-t-butyl-4-hydroxy benzyl)-5-triazine-2,4,6-(1H,3H,5H) trion; tetrakis- [methylene-3-(3',5-di-t-butyl-4'-hydroxy phenyl)-propionate]methane; and di(2-methyl-4-hydroxy-5-t-butyl phenyl)sulfide. Polymerized 2,2,4-trimethyl dihydroquinoline, 2,6,di-t-butyl-4-methylphenol, tetrakis [methylene 3-(3',5'-di-t-butyl-4'-hydroxyphenyl) propionate]methane can also be used.

A preferred hindered phenol is tetrakis [methylene 3-(3',5'-di-t-butyl-4'-hydroxyphenyl) propionate]methane and the preferred thio compound is distearyl thiodipropionate.

Other additives which may be employed in the compositions of the present invention include additives commonly employed in crosslinkable ethylene polymer based compositions including fillers, such as carbon black, clay, talc and calcium carbonate; blowing agents; nucleating agents for blown systems; lubricants; UV stabilizers; dyes and colorants; metal deactivators and coupling agents. The additional ingredients should not adversely effect crosslinking or rotational molding when the composition is used in a process to rotationally mold.

The compositions of this invention are prepared by mixing the ethylene polymer, crosslinking agent, the crosslinking co-agent, the stabilizer system using convention techniques employed in the polymer field, such as passage through mixing rolls or dispersion using conventional type mixers.

The mixture of the crosslinking compound, the polymer and the stabilizing system can be performed at about room temperature or a temperature different from room temperature but below that at which the crosslinking is effected. After uniform distribution of the crosslinking compound and the stabilizing system in the polymer, the mixture can be formed and shaped by conventional procedures. The composition of the present invention is particularly suitable for rotational molding.

The composition of the present invention results in a crosslinked polyethylene or polyethylene copolymer which is bubble free, and has a high gel content, preferably greater than 75 percent and more preferably greater than 80 percent when measured according to ASTM Test D2765. The composition can be molded to form articles having low temperature, high impact strength, preferably greater than 50 ft-lbs and more preferably, greater than 60 ft-lbs at $-40°$ F. when measured according to the Association of Rotomolder (ARM) Dart Impact Test Procedure. The composition results in crosslinked material having good stress crack resistance.

The present invention includes a method of rotational molding using the composition described above. The composition can be rotationally molded by conventional methods of rotational molding.

Typically the rotational molding process with the above-described composition comprises the steps of preparing the composition. The composition can be in powder or pellet form. Powders are preferably used with the powders preferably 35 mesh or smaller. The composition is heated within the mold as the mold is rotated. Typically, the mold rotates simultaneously about two perpendicular aces. The mold is heated until the polymer within the mold melt flows together and begins to crosslink on the inside surface of the mold. Generally, the mold rotates with a forced air circulating oven. The mold is then cooled and the molded article is removed.

The composition of the present invention can be processed in most commercial rotational molding machines. The oven temperature range during the heating step is from 400° F. to 700° F., preferably about 500° F. to about 650° F., and more preferably from about 575°

F. to about 625° F. If the temperature is too high during rotational molding the molding, the crosslinking begins prematurely and will not be uniform.

After the heating step the mold is cooled. The part must be cool enough to be easily removed from the mold and retain its shape. Preferably the mold is removed from the oven while continuing to rotate. Cool air is first blown on the mold. The air can be an ambient temperature. After the air has started to cool the mold for a controlled time period, a water spray can be used. The water cools the mold more rapidly. The water used can be at cold tap water temperature, usually from about 4° C. (40° F.) to about 16° C. (60° F.). After the water cooling step, another air cooling step may optionally be used. This is usually a short step during which the equipment dries with heat removed during the evaporation of the water.

The heating and cooling cycle times will depend on the equipment used and the article molded. Specific factors include the part thickness in the mold material. Typical conditions for a ⅛ inch thick part in a steel mold are to heat the mold in the oven with air at about 316° C. (600° F.) for about 15 minutes. The part is then cooled in ambient temperature forced air for about 8 minutes and then a tap water spray at about 10° C. (50° F.) for about 5 minutes. Optionally, the part is cooled in ambient temperature forced air for an additional 2 minutes.

During the heating and cooling steps the mold containing the molded article is continually rotated. Typically this along two perpendicular axes. The rate of rotation of the mold about each axis is limited by machine capability and the shape of the article being molded. A typical range of operation which can be used with the present invention is to have the ratio of rotation of the major axis to the minor axis of about 1:8 to 10:1 with a range of from 1:2 to 8:1 being preferred.

The composition of the present invention is a crosslinkable polyethylene composition based on a Ziegler-type catalystized polymerization or polyethylene having substantial terminal saturation, or polyethylene with residual acidic groups in the polymer matrix. The composition neutralized is useful in critical molding operation such as rotational molding where previously premature crosslinking and bubble formation had been a persistent problem.

Rotational molded articles of the present invention can be used where durability is essential in the sense that there is crack and puncture resistance. Examples of articles which can be made include gasoline tanks, large trash containers, and large bins or silos for fertilizer, etc.

Several examples are set forth below to illustrate the nature of the invention and the manner of carrying it out. However, the invention should not be considered as being limited to the details thereof. All parts are based on a composition containing 100 parts by weight of an ethylene polymer.

EXAMPLES 1-6

In Examples 1-6 crosslinkable high density polyethylene compositions were prepared and rotationally molded. The high density polyethylene had a density as measured by ASTM D-1505-63T in grams per cubic centimeter of 0.955. The polyethylene was made using a Ziegler type catalyst and had substantially complete saturation of terminal groups. The crosslinking agent was 2,5-dimethyl-2,5-[di(t-butylperoxy)hexane] sold as Lupersol 101 by Pennwalt Corp. The crosslinking coagent was triallyl trimellitate. The antioxidant was tetrakis[methylene 3-(3',5'-di-t-butyl-4'-hydroxyphenyl)-propionate]methane sold as Irganox 1010. The thio compound was distearyl thiodipropionate. The metal compound was zinc stearate. Additionally, a UV stabilizer, 2-hydroxy-4-n-octoxybenzophenone sold as Cyasorb 531 was used.

The compositions were prepared by first mixing the liquid components. The liquid was slowly added an continuously mixed with the other comonents including polyethylene which were in powder form. The physical blend was extruded through a 1 inch diameter single screw extruder having a L to D ratio of 24 to 1. The extruder was operated at the following temperature: Zone 1 - 200° F., Zone 2 - 260° F., Zone 3 - 260° F., Zone 4 - 260° F., Die - 260° F. The polymer was extruded as strands which were chopped to form pellets and ground on a Wedco SE-12 lab mill to a nominal size of 35 mesh or less.

The powder was used to rotationally mold a rectangular box 5½×5½×11 inches. The box had a wall thickness of about 125 mils. The mold was rotated uniaxially about its longest axis at about 5 rpm. The polymer was fed to the mold and the mold started to rotate. The rotating mold was heated for 35 minutes in an oven at 590° F. After the heating step the mold was cooled in forced air at about 72° F. for 7 minutes followed by tap water cooling for 8 minutes.

The molded boxes were tested for percent gel according to ASTM Test No. 2765 which measures the percentage of polymer insoluble in boiling xylene. The molded boxes were tested for cold temperature impact resistance according to the Association of Rotational Molders Dart Impact Testing Procedure using a 15 pound dart having a 1 inch diameter stem tip with a ½ inch diameter hemisphere dropped into a 125 mil sample. Samples were tested for stress crack resistance in accordance with ASTM Test No. 1693. All Example samples tested to greater than 1000 hours without stress cracking, while the Comparative cracked at less than 1000 hours.

The compositions and test results are summarized on the Table below. In Examples 5 and 6 the triallyl trimellitate was changed to triallyl isocyanurate and diallyl itaconate, respectively. Comparative 1 illustrates a composition without a co-agent. Compositions and results are summarized on Table 1 below:

TABLE 1

|  | Ex 1 | Ex 2 | Comp 1 | Ex 3 | Ex 4 | Ex 5 | Ex 6 |
| --- | --- | --- | --- | --- | --- | --- | --- |
| HDPE | 100 | 100 | 100 | 100 | 100 | 100 | 100 |
| MI g/10 min. | 6 | 20 | 20 | 30 | 40 | 20 | 20 |
| Lupersol 101 | .3 | .5 | .5 | .5 | .8 | .5 | .5 |
| Irganox 1010 | .02 | .02 | .02 | .02 | .02 | .02 | .02 |
| DSTDP | .05 | .05 | .05 | .05 | .05 | .05 | .05 |
| Cyasorb 531 | .2 | .2 | .2 | .2 | .2 | .2 | .2 |
| Zn St$_2$ | .05 | 0.05 | .05 | .05 | .05 | 0.05 | .05 |
| triallyl trimell. | 2.0 | 2.0 | — | 2.0 | 3.0 | — | — |
| triallyl isocy. | — | — | — | — | — | 2.0 | — |
| diallyl itaconate | — | — | — | — | — | 2.0 | 2.0 |
| % gel | 83.2 | 87.1 | 83.2 | 85.8 | 84.8 | 83.2 | 81.0 |
| impact ft-lb @ −40° F. | 75 | 60 | Shatter | 60 | 60 | 60 | 60 |

The molded boxes of Examples 1-6 had good surface appearance, mold release and no warpage. The polymer was homogeneous throughout. In Comparative 1 on Table 1 below, the polymer had bubbles and shattered upon impact.

EXAMPLES 7-8

These examples illustrate the use of peroxide scavengers in situations where it is desirable to inhibit the crosslinking reaction during preliminary processing. None of the compositions contained peroxide scavengers. The compositions of Comparative 2 and Examples 7 and 8 were prepared, processed, molded, and tested using the same procedures as Examples 1-6. The compositions and test results are summarized in Table 2 below. Environmental stress crack resistance was measured in hours to stress crack.

TABLE 2

|  | Ex. 7 | Ex. 8 | Comp 2 |
|---|---|---|---|
| HDPE | 100 | 100 | 100 |
| MI g/10 min. | 20 | 40 | 6 |
| Lupersol 101 | 0.5 | 0.8 | 0.3 |
| Irganox 1010 | 0.02 | 0.02 | 0.02 |
| DSTDP | — | — | — |
| Cyasorb 531 | 0.20 | 0.20 | 0.20 |
| Zn St$_2$ | 0.05 | 0.05 | 0.05 |
| triallyl trimell. | 2 | 2 | 2 |
| % gel | 88.0 | 85.4 | 85 |
| impact @ −40° F. (ft-lb) | 60 | 60 | 45 |
| hours to stress crack | >1000 | >1000 | 90 |

Examples 1, 7 and 8, and Comparative 2 show that for lower melt index polymer such as Example 1 having a MI of 6 g/10 min it is preferred to use a peroxide scavenger such as DSTDP when the composition is exposed to conditions which could cause premature crosslinking. Comparative 2 had a lumpy inner surface compared with the smooth inner surfaces of the rotationally molded boxes in Examples 1, 7 and 8.

COMPARATIVE 3

A composition was prepared using polyethylene made using chromium on SiO$_2$ catalyst in a solution polymerization conducted in cyclohexane. The polyethylene so produced had terminal group unsaturation —CH=CH$_2$. The solution method results in a polymer having a minimum of catalyst residue or acidic residue. The polyethylene had a Melt Index of 25 g/10 min. The composition contained 100 parts of polyethylene, 0.8 parts of

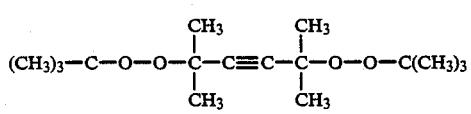

and 0.02 parts of Irganox 1010. The composition was prepared, blended, molded and tested in accordance with the same procedure as used in Examples 1-6. The molded article had a drop weight impact at −40° F. of 60 ft-lbs, no stress cracking after 1000 hours and good molding properties and appearance.

COMPARATIVE 4

Phillips Chemical Co. rotational molding grade polyethylene CL-100 was evaluated using the molding procedure described in Examples 1-6. The polyethylene is a solution polymerized material using a chromium type catalyst and has terminal unsaturation. It has a melt index of about 25-35. The composition contains about 0.80 parts by weight of the peroxide of Comp. 3 per 100 parts of polymer. The polymer has no significant catalyst residue. The composition does not contain a crosslinking co-agent. The mold composition had a drop weight impact value at −40° F. of 60 ft-lbs, no stress cracking after 1000 hours and good molding properties and appearance.

Comparative 1 and the Examples 1-8 indicate that the polyethylene having substantial complete terminal saturation requires a crosslinking co-agent to produce a satisfactory rotationally molded article, while Comparatives 3 and 4 indicate that polyethylene having terminal unsaturation require no such crosslinking co-agent to produce a satisfactory rotationally molded article. It is noted that Comparatives 3 and 4 had satisfactory color stability although a metal compound was not added.

While exemplary embodiments of the invention have been described, the true scope of the invention is to be determined from the following claims:

What is claimed is:

1. A composition consisting essentially of a polymer selected from the group consisting of ethylene homopolymers and ethylene copolymers, and mixtures thereof, the polymers having substantially complete terminal saturation:
   from 0.1 to 3.0 part by weight based on 100 parts of the polymer of an organic peroxide crosslinking agent;
   from 0.5 to 5.0 parts by weight based on 100 parts of the polymer of an allyl crosslinking co-agent or a co-agent selected from the group of dimethacrylate compounds, trimethacrylate compounds, divinyl benzene, vinyl toluene, vinyl pyridine, p-quinone dioxime, acrylic acid, cyclohexyl methacrylate, and 1,2-polybutadiene;
   sufficient amount of a metal compound having a cation selected from Group IIA and IIB of the Periodic Table of Elements to substantially neutralize acidic compound in the polymer; and
   a peroxide scavenger.

2. The composition as recited in claim 1 wherein the metal cation is provided as a metal compound having a corresponding anion selected from the group consisting of stearates, oxides, hydroxides, hydrides, formates, acetates, alcoholates, and glycolates.

3. The composition as recited in claim 2 wherein the metal compound is selected from zinc stearate, calcium stearate, magnesium oxide, zinc oxide and calcium hydroxide.

4. The composition as recited in claim 1 wherein the organic peroxide has the formula

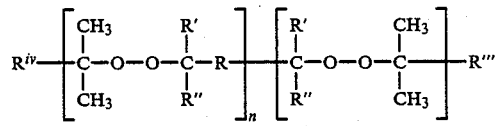

wherein
   R is a C$_2$ to C$_{12}$ divalent hydrocarbon radical,
   R' and R" are the same or different C$_1$ to C$_{12}$ alkyl groups,
   R''' and R$^{iv}$ are the same or different C$_1$ to C$_{12}$ monovalent hydrocarbon radicals, and
   n is 0 or 1.

5. The composition as recited in claim 4 wherein the organic peroxide has the formula:

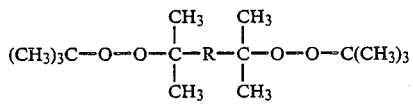

wherein R is selected from the group of

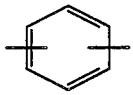, —C≡C—, —C≡C—C≡C—, and

—(CH₂—CH₂)ₙ— wherein n = 1 to 8.

6. The composition as recited in claim 1 wherein the allyl crosslinking co-agent is selected from the group consisting of allyl compounds, diallyl compounds and triallyl compounds.

7. The composition as recited in claim 6 wherein the allyl compound is allyl methacrylate, the diallyl compounds are selected from the group of diallyl itaconate, and diallyl phthalate, the triallyl compounds are selected from the group of triallyl trimellitate, trimethallyl trimellitate, triallyl cyanurate, and triallyl phosphate, the dimethylacrylate compounds are selected from the group of ethylene dimethacrylate, polyethylene glycol dimethacrylate, and trimethylol propane trimethacrylate.

8. The composition as recited in claim 1 wherein the crosslinking co-agent is an allyl carboxylate.

9. The composition as recited in claim 1 further comprising an oxidation inhibitor.

10. The composition as recited in claim 9 wherein the oxidation inhibitor is a hindered phenolic compound.

11. The composition as recited in claim 1 wherein the peroxide scavenger is a thio compound.

12. The composition as recited in claim 1 wherein the organic peroxide has the formula

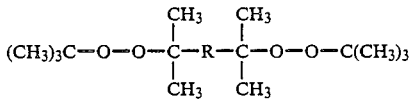

wherein R is selected from the group of

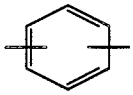, —C≡C—, —C≡C—C≡C—, and

—CH₂—CH₂—;

the crosslinking co-agent is selected from diallyl compounds and triallyl compounds;
the metal cation is provided as a metal compound selected from the group consisting of zinc stearate, calcium stearate, magnesium oxide, zinc oxide, and calcium hydroxide, and
the a peroxide scavenger is a thio compound.

13. The composition as recited in claim 1 wherein there is present an allyl carboxylate cross-linking agent.

14. The composition as recited in claim 13 wherein said allyl carboxylate is selected from the group consisting of triallyl trimellitate, trimethallyl trimellitate, diallyl phthalage, diallyl itaconate and allyl methacrylate.

15. The composition as recited in claim 1 wherein said composition includes at least 0.005 parts by weight based on 100 parts by weight of the polymer of said metal compound and 0.01 to 0.1 parts of said peroxide scavenger.

16. The composition as recited in claim 15 wherein said allyl crosslinking co-agent is an allyl carboxylate, said metal compound is zinc stearate and said peroxide scavenger is a thiodipropionic acid ester.

17. The composition as recited in claim 16 wherein said polymer is high density polyethylene.

* * * * *